United States Patent Office 3,362,881
Patented Jan. 9, 1968

3,362,881
SUSTAINED RELEASE TABLET AND METHOD
OF MANUFACTURING SAME
Klaus Eberhardt, Reinbek, and Horst Röthing, Biberach an der Riss, Germany, assignors to Boehringer Ingelheim G.m.b.H., Ingelheim am Rhine, Germany, a corporation of Germany
No Drawing. Filed July 7, 1964, Ser. No. 380,921
Claims priority, application Germany, July 15, 1963, B 72,689; Apr. 10, 1964, B 76,281
8 Claims. (Cl. 167—82)

This invention relates to novel dosage unit compositions of medicinal agents for oral administration in the form of tablets or coated pills, said compositions having delayed release action including the ability to release the medicinal agent gradually over a relatively long period of time, as well as to a method of manufacturing such compositions.

To ensure a long-lasting, continuous and not too intensive effective action of a therapeutic agent in the human body, it is necessary to be able to delay the absorption of the therapeutic agent by the body. This is especially important for water-soluble medicinal agents which are normally absorbed by the body fluids immediately after administration and consequently produce only a very short duration of effective action.

Two fundamentally different methods are known to prolong the duration of effective action of a therapeutic agent in the body. One of these comprises chemically altering a given therapeutic agent to such a degree, that its absorption by the body is sufficiently delayed. Examples of this method are the development of the sustained release compositions of sulfonamide and the sustained release compositions of insulin. The second fundamental method involves the preparation of the so-called sustained release tablets or pills, in which the active therapeutic ingredient remains chemically unchanged, but its absorption by the body is delayed only by physical means, that is, by mechanical admixture of therapeutically inert auxiliary ingredients. This second method, which is employed in conjunction with the present invention, has the advantage of greater simplicity and safety, because a chemical alteration may produce pharmacologically undesirable changes, whereas a mere mechanical admixture of inert auxiliary ingredients forestalls such danger to a substantial degree.

Numerous methods for the manufacture of pharmaceutical tablets or pills with sustained release action of the therapeutic ingredient have already been described, these methods being based on various principles. For instance, a pharmaceutical sustained release composition is known wherein the active therapeutic ingredient is sandwiched between various layers of the inert auxiliary ingredients and where only after the dissolution of the outer layer, which consists of an insert auxiliary ingredient, the layer of active ingredient thereunder is exposed. In other words, the active ingredient is released intermittently in batches.

Another form of the sustained release composition in dosage unit form is the enteric-coated pill, in which the core comprising the active ingredient is simply coated with a protective substance which is not dissolved by the stomach fluids. This form is used mostly for those active ingredients which are intended to pass through the stomach nearly unchanged and to be released gradually in the intestines.

Another method of delaying the release of an active therapeutic ingredient, which may, strictly interpreted, be considered a chemical alteration, is to cause the active ingredient to form sparsely soluble salts, for example, with pamoic acid, or salts with the macro-molecular ions of ion-exchange resins. Here, too, the active ingredient is ultimately released in chemically unaltered form.

It is further known to prepare granulates from intimate mixtures consisting of an active therapeutic ingredient and release-retarding substances and to press these into tablets. In this embodiment each individual particle of the active ingredient forms a more or less complete unit with the auxiliary ingredients, which unit represents a multiple-layer tablet in miniature. In this manner the gradual release of the active ingredient is broken up into multiple, small individual batches, rendering it almost continuous.

In connection with the last described method many auxiliary ingreadients and mixtures have been tested. The tablets or pills thus obtained do not yet meet all requirements and embody several shortcomings. Especially in the case of water-soluble medicinal agents, the therapeutic ingredient is not released uniformly enough for over a sufficiently long period of time; with some water-soluble active ingredients no useful results could heretofore be obtained by using the customary methods. The release period is, for example, frequently dependent upon the pH value or upon the enzymes of the body fluids, so that, consequently, for different patients the release periods may vary. Furthermore, the pressure applied to the composition in forming the tablets is often an essential factor; frequently slight changes in the pressure may cause distinct variations in the release periods. Also, until now the weight ratio of active ingredient to auxiliary substances for water-soluble active ingredients was rather unfavorable; for this reason the known sustained release tablets may in most cases contain only very small quantities of active ingredient.

According to the invention, sustained release tablets or pills may now be prepared which do not exhibit the shortcomings enumerated above and which may contain relatively large amounts of active ingredients. Thus, according to the present invention, the active ingredient is first admixed with one or more gel-forming, swelling agents and also with a water-insoluble polymer or film-forming agent in the presence of an organic solvent or organic solvent mixture in which the active ingredient is insoluble, and then the mixture is pressed into tablet cores in the conventional manner. A particularly favorable embodiment of the process consists of first admixing the active ingredient and swelling agents, then granulating the mixture with a solution of the water-insoluble polymer or film former in the organic solvent or solvent mixture, and finally processing the granulate into pill cores in customary fashion.

The swelling agents which may be used according to the invention are substances which swell and form a gel upon contact with water and which, due to these characteristics, have other diverse uses in industry, for instance, as thickeners, additives for adhesives, binders, suspension and emulsifying agents. Specific examples of such swelling agents are the following: cellulose ethers, such as carboxymethyl cellulose (CMC), methylcellulose, hydroxyethyl cellulose, polyacrylic acid (Carbopol 934), sodium alginate and pectin. Particularly preferred is the use of carboxymethyl cellulose (sodium salt) and polyacrylic acid.

As water-insoluble polymers the customary polymer-substances may be employed. Particularly suitable is a polyvinyl-acetate of medium viscosity, the use of which is preferred.

An example of a suitable film-forming agent is cellulose acetate phthalate (CAP), which is used preferably in admixture with stearic acid. Other macro-molecular substances with similar characteristics may also be used.

The amount of swelling agents in the sustained release composition may vary between about 50 to 500% by weight, based on the weight of active ingredient, whereas the total weight of polymers and film-forming agents may vary between about 10 and 50% by weight. By appropriate choice of the quantitative ratios of active ingredient, swelling agents and polymer or film-forming agent, the period of sustained release may be varied within wide limits. When a high initial release dose is desired, additional active ingredient may be applied or pressed, in the customary manner, onto the tablet cores which have been obtained according to the above-described novel process.

The selection of a suitable organic solvent or solvent mixture depends upon the particular active ingredient employed, which has to be insoluble therein, and further depends upon the nature of the water-insoluble polymer or film former, which has to be soluble in the solvent. Examples of suitable solvents are acetone, ethylacetate and tetrahydrofuran. Also, a mixture of 90 parts of chloroform and 10 parts of isopropanol may be used to good advantage.

According to the process of the invention, sustained release tablets may be prepared even from those active therapeutic ingredients where all other methods have completely failed. For instance, no method has heretofore been found by which sustained release tablets could be obtained from which the antitussive, easily water-soluble 1-p-chlorophenyl-2,3-dimethyl-4 - dimethylaminobutanol-(2)-HCl is sufficiently slowly released. According to the present process, however, tablets may be prepared with these active ingredients from which the active ingredient is gradually and uniformly released over a period of six to twelve hours; the rate of release may be increased within wide limits by increasing the content of swelling agent, or it may be reduced by increasing the content of water-insoluble polymers or film formers. A special advantage resides in that in vitro tests in synthetic gastric juices and in synthetic intestinal juices (both prepared according to USP XVI) have shown that the release rate is also independent of the pH value, of the enzymatic fermentation activities and of the pressure used during the preparation of the tablets, as is evident from the examples below.

The results obtained from the in vitro tests have also been confirmed by clinical tests on several hundred patients. Using the sustained release tablets prepared according to the present invention, comprising the normal daily dose of 1-p-chlorophenyl-2,3-dimethyl-4-dimethylaminobutanol-(2)-hydrochloride (0.1 gm.), the cough stimulus was sufficiently suppressed with one tablet for as long as twelve hours; especially the slight variation of the period of effective action among the individual persons subjected to this test is surprising.

By means of the process of the invention, considerable improvements may also be attained in conjunction with those active ingredients which have previously been incorporated into sustained release compositions in tablet form. For instance, compared to the sustained release composition described in United States Patent No. 2,928,771, a sustained release composition with a substantially broader range of variation with respect to the absorption rate and with a far greater uniformity of the release periods may be obtained with phenmetrazine-HCl. Simply by selecting the appropriate mixture ratio the release periods can be predetermined with accuracy. Thus, for first time, a phenmetrazine sustained release tablet is available which is readily adaptable to meet the most diverse practical requirements merely by using the novel and simple manufacturing process according to the present invention.

The following examples illustrate the preparation of a few representative sustained release tablets embodying the concept of the present invention. It should be understood, however, that the invention is not limited to the particular examples given below.

EXAMPLE 1

100 gm. of 1-β-chlorophenyl-2,3-dimethyl-4 - dimethylaminobutanol-(2)-hydrochloride were admixed with 140 gm. of pulverized highly viscous carboxymethyl cellulose (commercially available under the name CMC 7 HSP from Hercules Powder Company, Wilmington, Del.; or under the name Tylose C 1000p from Kalle & Co., A. G., Wiesbaden-Biebrich, Germany). The mixture was kneaded thoroughly in a solution of 30 gm. of polyvinylacetate of medium viscosity (commercially available under the name Vinapas B 100 from Wacker-Chemie G.m.b.H., Munich, Germany) in 80 ml. of acetone. The moist mass was then granulated through a 1 mm.-mesh sieve and was thereafter dried at a temperature of 40° C. One thousand pill cores, each having a weight of 270 mgm. and a diameter of 9.5 mm., were pressed from the dry granulate by means of a conventional tablet making machine.

Thereafter, an additional jacket consisting of 50 mgm. of finely pulverized 1-p-chlorophenyl-2,3-dimethyl - 4 - dimethylaminobutanol-(2)-hydrochloride per pill core was pressed by conventional means onto the cores prepared as described above. Next, the pill was covered with a conventional pill coating consisting essentially of sugar and talcum. The final weight of each coated pill was 500 mgm.

The coated pills prepared in this manner, when tested for release of the active ingredient in distilled water at a temperature of 37° C., produced an initial release action (measured after 30 minutes) of 35% of the total amount of active ingredient in each pill. The remaining amount of the active ingredient was released at a uniform rate over a period of 7½ hours. If, instead of distilled water, synthetic intestinal fluid (USP XVI) was used, the initial release amounted to 32%. The remaining amount of active ingredient was released also over a period of 7½ hours. When using synthetic gastric juice, the initial release amounted to 38%, and the remaining active ingredient was released over a period of 6 to 7 hours.

The following table illustrates two variations of the example described above and their effect upon the release rate:

| Amount of polyvinylacetate used, gm. | Initial release after 90 min. at 37° C., percent | Total release time, hrs. |
| --- | --- | --- |
| 20 | 35 | 4 |
| 40 | 20 | 9 |

EXAMPLE 2

100 gm. of 1-p-chlorophenyl-2,3-dimethyl-4-dimethylaminobutanol-(2) hydrochloride were admixed with 140 gm. of pulverized highly viscous carboxymethyl cellulose and 30 gm. of polyvinylacetate of medium viscosity. The mixture was thoroughly kneaded in 80 ml. of acetone; the moist mass was dried at a temperature of 40° C. and the dry mixture was pulverized with the aid of a conventional pulverizer. From the pulverized mass thus obtained, 1000 pill cores were pressed, each having a weight of 270 mgm. and a diameter of 9.5 mm. The pill cores, upon being tested for release rate of the active ingredient in distilled water at a temperature of 37° C., produced an initial release (measured after 1½ hours) of about 25% of the total amount of active ingredient. The remaining amount of the active ingredient was released at a uniform rate over a period of 7½ hours.

This release period is independent of the pressure with which the dried mixture is formed into pills; for instance, it is 7½ hours when a pressure of 11 kg. or a pressure of only 5 kg. has been applied (measured with the Monsanto hardness tester).

EXAMPLE 3

50 gm. of 2-phenyl-3-methyl-tetrahydro-1,4-oxazine hydrochloride (phenmetrazine-HCl) were admixed with 40 gm. of carbomethyl cellulose (Tylose C 1000p), 30 gm. of polyvinylpyrrolidone (Kollidon 25) and 60 gm. of polyacrylic acid (Carbopol 934). The mixture was kneaded with a solution of 20 gm. of cellulose acetate phthalate and 10 gm. of stearic acid in 200 ml. of a mixture of 10% isopropanol and 90% chloroform. The moist mass was partially dried at a temperature of 50° C., then granulated through a 4-mm.-mesh screen, and after subsequent complete drying forced once again through a 1 mm.-mesh screen. From the granulate obtained in this manner 1000 pill cores were formed, each having a weight of 210 mgm. and a diameter of 9 mm. They were covered in the usual manner with a sugar coating (final weight 350 mgm.). The release of the active ingredient (phenmetrazine) from these pills, measured in synthetic digestive juices at temperatures of 37° C. with the release measuring device according to USP XVI, lies within the following tolerances:

| Hours: | Percent |
|---|---|
| 1 | 20 to 35 |
| 3 | 40 to 60 |
| 5 | 55 to 75 |
| 7 | 66 to 100 |

EXAMPLE 4

One thousand pill cores, each having a weight of 270 mgm. and a diameter of 9.5 mm. were prepared from 100 gm. of 1-p-chlorophenyl-2,3-dimethyl-4-dimethylaminobutanol-(2) hydrochloride, 140 gm. of carboxymethyl cellulose and 30 gm. of polyvinylacetate, as described in Example 1. Next, 50 gm. of 1-p-chlorophenyl-2,3-dimethyl-4-dimethylaminobutanol-(2) hydrochloride were admixed with 180 gm. of calcium hydrogen phosphate and 35 gm. of potato starch and the mixture was thoroughly kneaded with a solution of 12.5 gm. of polyethyleneglycol and 5 gm. of glycerin in 4 gm. of water and 30 gm. of ethanol. The moist mass was granulated in the usual manner. 5 gm. of talcum and 2.5 gm. of magnesium stearate were admixed with the dry granulate. The resulting mixture was applied to the pill cores as a coating by conventional means. The diameter of the coated tablets was 11.5 mm. and the total weight of each was 560 mgm.

The coated tablets thus obtained released the active ingredient at a sustained rate over a period of 6 to 7 hours under physiological conditions.

EXAMPLE 5

50 gm. of 2-phenyl-3-methyl-tetrahydro-1,4-oxazine hydrochloride were admixed with 40 gm. of carboxymethyl cellulose (Tylose C 1000p), 30 gm. of polyvinylpyrrolidone (Kollidon 25) and 60 gm. of polyacrylic acid (Carbopol 934) and, as described in Example 3, the mixture was pressed into 1000 tablet cores, each having a weight of 210 mgm. and a diameter of 9 mm.

Next, 25 gm. of 2-phenyl-3-methyl-tetrahydro-1,4-oxazine hydrochloride, 240 gm. of ethyl cellulose, 30 gm. of polyvinylpyrrolidone (Kollidon 25) and 5 gm. of stearic acid were admixed with each other. The mixture was granulated in the usual manner. Then the granulate was applied by customary methods to the tablet cores as a coating. The diameter of the coated tablets was 12 mm. and the total weight of each was 510 mgm.

The coated tablets thus prepared produced an initial release of about 30 to 35% of the total amount of active ingredient (measured after one hour) in synthetic digestive fluids at a temperature of 37° C. The remaining amount of active ingredient was released at a uniform rate over a period of 6 to 7 hours.

EXAMPLE 6

50 gm. of 2-phenyl-3-methyl-tetrahydro-1,4-oxazine hydrochloride were admixed with 150 gm. of carboxymethyl cellulose (Tylose C 1000p) and 10 gm. of stearic acid. The mixture was then kneaded with a solution of 20 gm. of cellulose acetate phthalate (CAP) in 100 ml. of a mixture of 60% ethylacetate and 40% ethyl alcohol. The moist mass was partially dried at a temperature of about 50° C., granulated through a 4 mm.-mesh screen and, after subsequent complete drying, again forced through a 1 mm.-mesh screen. From the dry granulate thus obtained 1000 pill cores, each having a weight of 230 mgm. and a diameter of 9 mm., were pressed. They were then coated with a sugar coating in the usual manner (final weight of each pill 370 mgm.).

The pills thus prepared produced an initial release, measured after one hour, of about 35% of the total amount of active ingredient in synthetic digestive fluids at a temperature of 37° C. The remaining active ingredient was released at a sustained rate over a period of 6 to 7 hours.

EXAMPLE 7

One thousand tablet cores, each having a weight of 230 mgm. and a diameter of 9 mm., were prepared from 50 gm. of 2-phenyl-3-methyl-tetrahydro-1,4-oxazine hydrochloride, 150 gm. of carboxymethyl cellulose, 20 gm. of cellulose acetate phthalate and 10 gm. of stearic acid, as described in Example 6. Next, 25 gm. of 2-phenyl-3-methyl-tetrahydro-1,4-oxazine hydrochloride, 240 gm. of ethyl cellulose, 30 gm. of polyvinylpyrrolidone (Kollidon 25) and 5 gm. of stearic acid were admixed with each other, and the mixture was granulated. The granulate was then applied as a coating to the tablet cores by customary methods. The diameter of the coated tablets was 12 mm.; the total weight of each was 530 mgm.

The coated tablets thus prepared produced an initial release, measured after 1 hour, of about 30 to 35% of the total amount of active ingredient in synthetic digestive fluids at a temperature of 37° C. The remaining amount of active ingredient was released at a sustained rate over a period of 6 to 7 hours.

While we have illustrated our invention with the aid of certain specific embodiments thereof, it will be readily apparent to others skilled in the art that our invention is not limited to those particular embodiments, and that various changes and modifications may be made without departing from the spirit of the invention or the scope of the appended claims.

We claim:

1. A compressed pharmaceutical tablet for oral administration characterized by its ability to release its active therapeutic component at a substantially uniform rate in the gastro-intestinal tract, said tablet consisting essentially of a compressed mixture of an effective amount of an active therapeutic agent, 50 to 500% by weight, based on the weight of said therapeutic agent, of a swelling agent selected from the group consisting of carboxymethyl cellulose, alkali metal salts of carboxymethyl cellulose, polyacrylic acid and mixtures thereof and 10 to 50% by weight, based on the weight of said therapeutic agent, of an ingredient selected from the group consisting of medium viscosity polyvinylacetate water-insoluble polymer and cellulose acetate phthalate film-forming agent.

2. A compressed pharmaceutical tablet as in claim 1, wherein the swelling agent is the sodium salt of carboxymethyl cellulose and the water-insoluble polymer is polyvinylacetate of medium viscosity.

3. A compressed pharmaceutical tablet as in claim 1, wherein the swelling agent is selected from the group consisting of carboxymethyl cellulose, alkali metal salts of carboxymethyl cellulose, polyacrylic acid and mixtures thereof, and the film-forming agent is cellulose acetate phthalate.

4. The method of manufacturing sustained release pharmaceutical tablets for oral administration, comprising intimately admixing an active therapeutic agent with 50 to 500% by weight, based on the weight of said therapeutic agent, of a swelling agent selected from the group consisting of carboxymethyl cellulose, alkali metal salts of carboxymethyl cellulose, polyacrylic acid and mixtures thereof and with 10 to 50% by weight, based on the weight of said therapeutic agent, of a substance selected from the group consisting of medium viscosity polyvinylacetate water-insoluble polymer and cellulose acetate phthalate film-forming agent in the presence of an inert organic solvent wherein said therapeutic agent is insoluble, and then compressing the intimately mixed ingredients to form said tablets.

5. The method of manufacturing sustained release tablets as in claim 4, wherein the active therapeutic agent is first intimately admixed with the swelling agent and the resulting mixture is then granulated with a solution of said polymeric or film-forming substance in said inert organic solvent.

6. The method of manufacturing sustained release tablets as in claim 4, wherein the swelling agent is the sodium salt of carboxymethyl cellulose and the water-insoluble polymer is polyvinylacetate of medium viscosity.

7. The method of manufacturing sustained release tablets as in claim 4, wherein the swelling agent is selected from the group consisting of carboxymethyl cellulose, alkali metal salts of carboxymethyl cellulose, polyacrylic acid and mixtures thereof, and the film-forming agent is cellulose acetate phthalate.

8. The method of manufacturing sustained release tablets as in claim 4, wherein said inert organic solvent is selected from the group consisting of acetone, ethylacetate, tetrahydrofuran and a mixture of 10 parts chloroform and 10 parts isopropanol.

References Cited

UNITED STATES PATENTS

| | | | |
|---|---|---|---|
| 2,991,226 | 7/1961 | Millar et al. | 167—82 |
| 3,102,845 | 9/1963 | Fennell | 167—82 |
| 3,133,863 | 5/1964 | Tansey | 167—82 |
| 3,136,695 | 6/1964 | Tansey | 167—82 |
| 3,148,124 | 9/1964 | Gaunt | 167—82 |
| 3,266,992 | 8/1966 | De Jong | 167—82 |

LEWIS GOTTS, *Primary Examiner.*

S. K. ROSE, *Assistant Examiner.*